No. 799,373. PATENTED SEPT. 12, 1905.
T. F. GAEBLER.
VAULT MOLD.
APPLICATION FILED APR. 26, 1905.
3 SHEETS—SHEET 1.
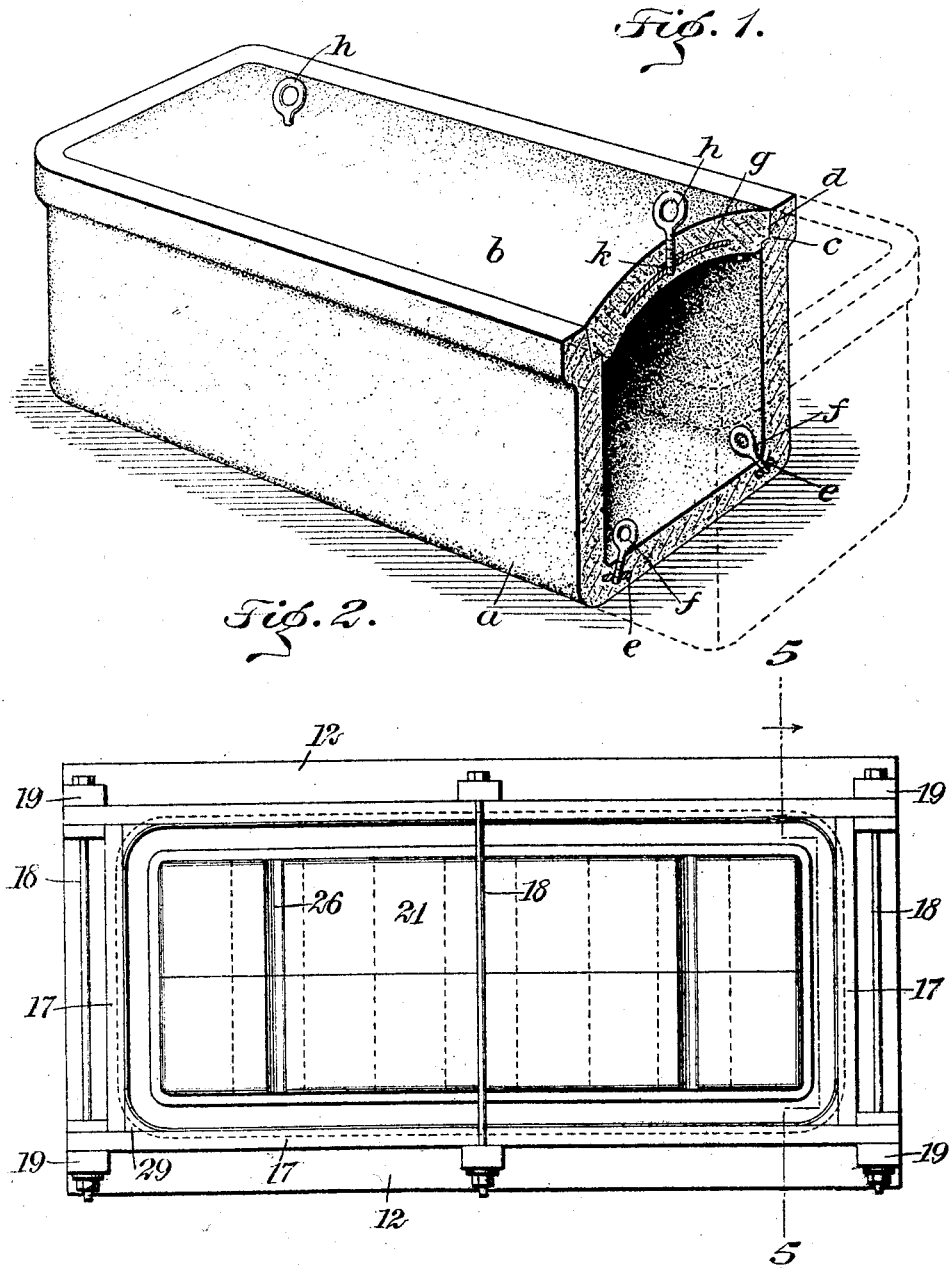
WITNESSES:
O. C. Abbott
A. E. Fay
INVENTOR
Theodore F. Gaebler
BY
ATTORNEYS

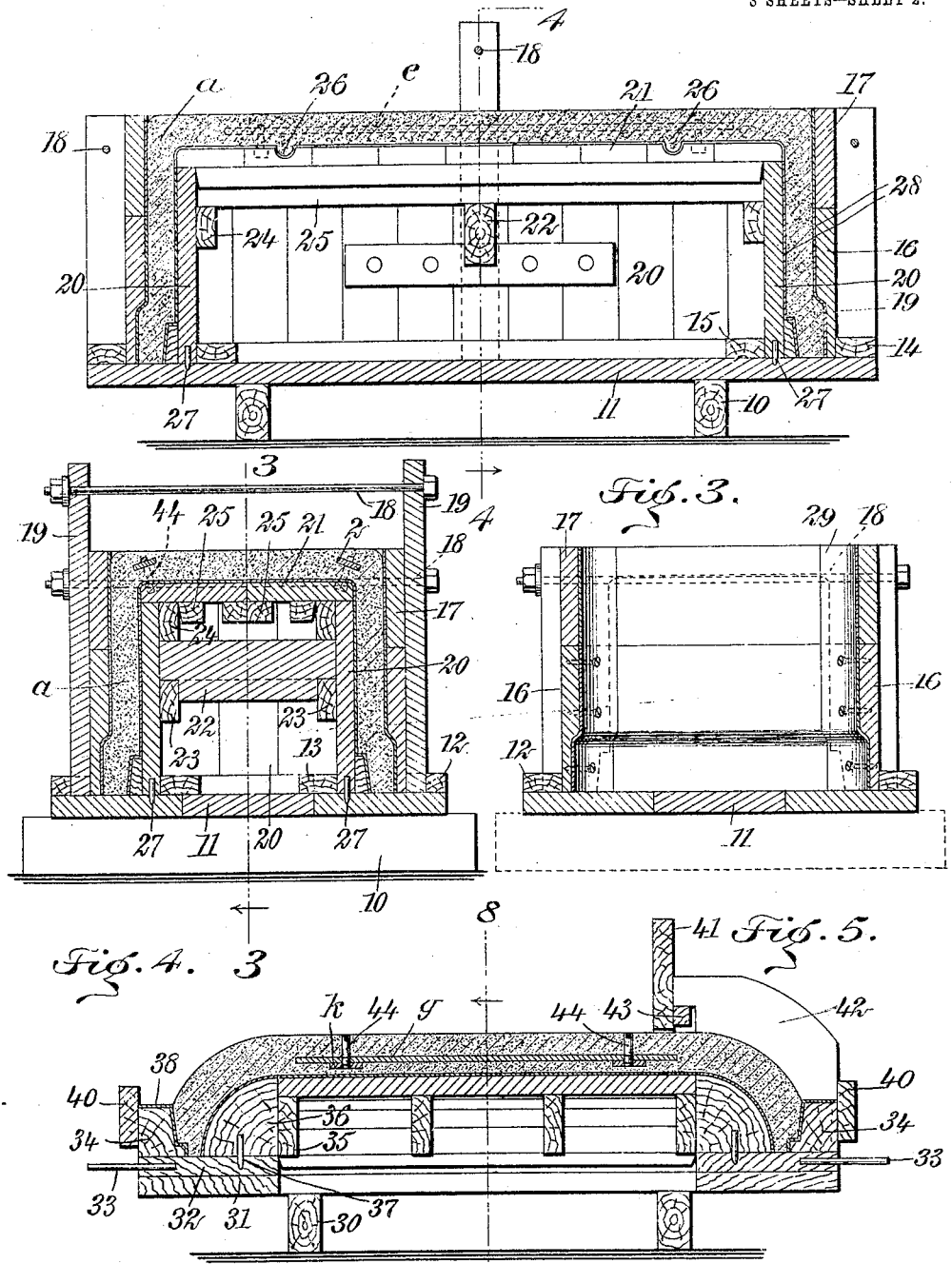

No. 799,373. PATENTED SEPT. 12, 1905.
T. F. GAEBLER.
VAULT MOLD.
APPLICATION FILED APR. 26, 1905.

3 SHEETS—SHEET 3.

WITNESSES:
H. C. Abbott
O. E. Fay

INVENTOR
Theodore F. Gaebler
BY
ATTORNEYS

UNITED STATES PATENT OFFICE.

THEODORE FRANCIS GAEBLER, OF ROCKVILLE, INDIANA.

VAULT-MOLD.

No. 799,373.  Specification of Letters Patent.  Patented Sept. 12, 1905.

Application filed April 26, 1905. Serial No. 257,494.

*To all whom it may concern:*

Be it known that I, THEODORE FRANCIS GAEBLER, a citizen of the United States, and a resident of Rockville, in the county of Parke and State of Indiana, have invented a new and Improved Vault-Mold, of which the following is a full, clear, and exact description.

My invention relates to a mold for manufacturing burial-vaults from plastic materials. The principal objects of the invention are to provide means whereby burial-vaults can be made rapidly and economically and at the same time improve the structure and appearance of the vaults themselves.

Reference is to be had to the accompanying drawings, forming a part of this specification, in which similar characters of reference indicate corresponding parts in all the figures.

Figures 7, 8:
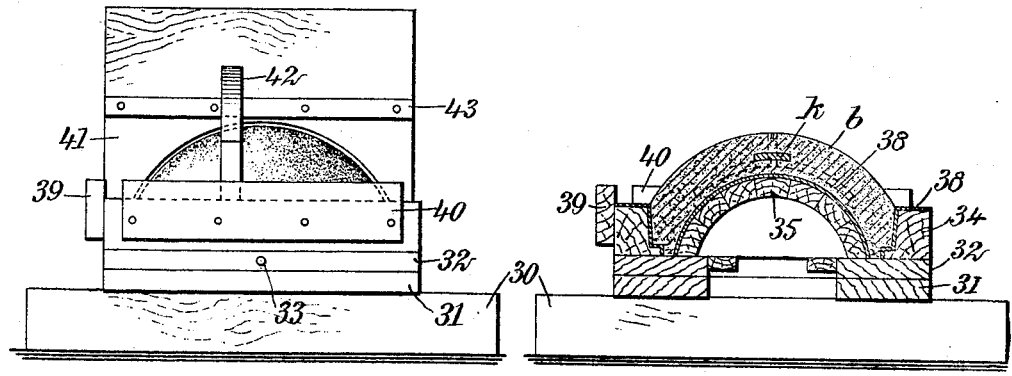
Figure 9:
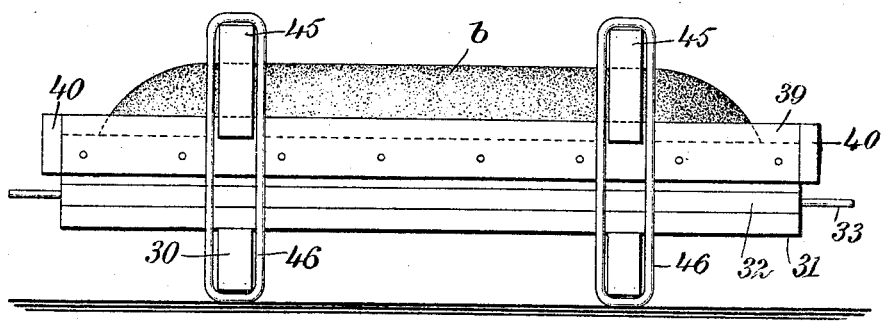
Figure 10:
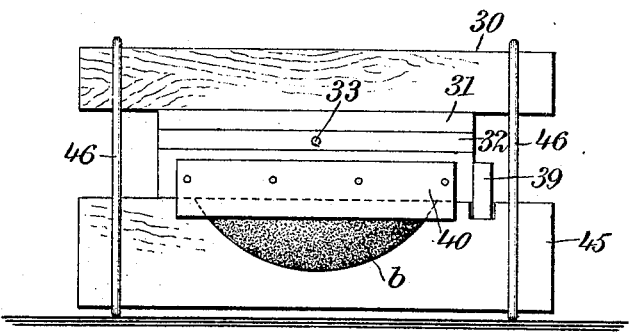

Figure 1 is a perspective view, partly in section, of a vault constructed by the use of my improved mold. Fig. 2 is a plan of a mold constructed in accordance with the principle of my invention. Fig. 3 is a central longitudinal section of the same on the line 3 3 of Fig. 4. Fig. 4 is a transverse sectional view on the line 4 4 of Fig. 3. Fig. 5 is a sectional view on the line 5 5 of Fig. 2. Fig. 6 is a longitudinal sectional view of a mold for making a cover for the vault. Fig. 7 is an end elevation of the same. Fig. 8 is a sectional view on the line 8 8 of Fig. 6. Fig. 9 is a side elevation of the structure shown in Fig. 6, showing it in position ready to be reversed; and Fig. 10 is an end elevation of the device shown in Fig. 9 in reversed position.

Fig. 1 shows a vault $a$, having a cover $b$. The vault is provided with a rabbeted inner upper edge $c$ for the reception of a projecting edge $d$ of the cover. Within the vault, near the lower corners thereof or at any other convenient place, are located longitudinal strengthening-bars $e$, into which are screwed eyes $f$ for assisting in the manipulations of the vault in use. The cover is also provided with a strengthening-plate $g$, into which are screwed eyes $h$ for a similar purpose.

Referring now to Figs. 2, 3, 4, and 5, I will describe a mold which I have illustrated for constructing the body of the vault. This mold rests upon supports 10, upon which is a base 11. This base is provided with longitudinal strips 12 and 13 and transverse strips 14 and 15. The strips 12 and 14 are designed to abut against and hold the walls 16 of the mold. These walls are preferably not made continuous to the top of the mold, but are pieced out by means of extension-pieces 17, held together by transverse rods 18. These rods pass through uprights 19, which come into contact directly with the strips 12. The lower part of the inside surface of each of the walls 16 is preferably provided with an offset portion $16^a$ for the purpose of molding a projection on the edge of the vault.

I prefer to mold the vault in a reverse position with its bottom at the top of the mold, and in order to provide for forming the inside surface of the vault I use a sectional core made up of end and side walls 20 and a top 21. The end and side walls are preferably formed with a cross-piece 22 in the center to hold them together and with longitudinal bars 23, upon which the cross-piece rests. They are also provided with transverse and longitudinal pieces 24 at the top corresponding with the pieces 13 and 15, described above. These parts are fitted together as shown in the drawings, so as to afford a proper support for the walls of the core and so as to hold the parts thereof together. The top piece of the core is shown as being made in two parts, each part being provided with cleats 25, engaging with each other or with the longitudinal pieces 24, so as to guide the top plate accurately into position. The top surface of the top plate is preferably provided with grooves 26, passing transversely across it, to afford projections in the interior of the vault for the support of the casket in order that the lowering-straps may be easily withdrawn. The projections may be of any form and are molded in one piece with the bottom of the vault.

The walls 20 of the core are preferably provided with dowel-pins 27, by means of which it is fixed in place on the bottom plate 11, and both the core and mold walls are lined or coated with any desired substance 28 to prevent the concrete from adhering to the walls. Sheet-iron, tin, paper, muslin, and the like can be used for this purpose. In order to prevent cracking or checking, the corners are rounded, as it is usual for cement work to crack at the angle where the angle is sharp. When the material has been molded in the mold a week, a straight-edge is swept along the walls 17 to form the bottom of the vault.

A mold for forming the cover will now be described, reference being had to Figs. 6 to 10, inclusive. On standards 30, constituting a support, a plate 31 is mounted, bearing a second plate 32, which is provided with trunnions 33 at its ends. This plate bears a mold-wall 34, extending entirely around the same. A sectional core, having a central arch 35, is located upon the plate 32, and at the ends of this arch two blocks 36, (shown in Fig. 6,) having a curved outer surface corresponding with the curve of the arch, are provided. These blocks are secured to the plate 32 by dowels 37, the arch and blocks together constituting the core. The core and walls 34 are provided with a lining or coating 38, as in the case of the mold for the main part of the vault. Upon the outside of the walls 34 are located guides 39 and 40. The guides 39 are designed for directing a sweep or former 41, which is used to shape the top surface of the material in the mold. This former is applied after the plastic material is put in place and is swept along the top surface to reduce the same to a uniform shape corresponding with the configuration of the active surface of the former. After this operation has been completed the former is left at the end of its stroke, and a former 42, guided by a guide 40 and a strip 43 on the former 41, is swept along the end of the mold to accurately form the end of the cover.

The operation of molding will be readily understood. In both the molding of the vault and the cover the plates $e$ and $g$ are placed in the plastic material during the operation of molding and before the final shaping of the top surface is completed, and stubs 44, provided with screw-threads to engage heads $k$, are molded into the material in the process of making the vault and cover. When the molding operation is completed and the material has hardened, these stubs are removed, so that the eyelets $f$ and $h$ can be inserted in their places.

In Figs. 9 and 10 additional features are shown. These involve a pair of cradles 45, which are formed with their inner surfaces corresponding substantially with the outer surface of the molded article. They are placed over the mold after the material has hardened sufficiently to permit it to be moved, and links 46 are placed over the cradles and under the supports 30 to secure them together. The trunnions 33, which project at the ends, are then connected with a hoisting apparatus, and upon the elevation of the device it will tip over on account of the center of gravity being above the line between the trunnions. It can then be lowered to the position shown in Fig. 10 and the article left supported on the cradles and the mold removed, when the drying operation can be completed.

It is thought that the operation of molding will be clearly understood from the description above given and that it will not be necessary to describe it in detail. It is sufficient to say that the molding is partially done by the mold and core itself and completed by the use of the sweeps or formers and that the mold itself is used to hold the article in shape while the preliminary hardening operation is proceeding, while it may be removed before this operation is completed on account of the use of the cradles 45. In the manufacture of the main part of the vault the molding material is first placed within the walls 16 and, if necessary, tamped. Then the extensions 17 are added and the concrete carried up to the top of the mold, where it is spread over the top of the core and forms the bottom of the vault. The inserts $e$, $g$, and $k$ are placed in the plastic material at the proper time. The use of the eyelets is to provide for the handling of the vault and cover, and when they have been lowered into the grave the eyelets are removed and the holes filled with cement.

Making the walls in two pieces with the extensions 17 permits the molding of the top edge of the vault as thick as any other part, thus retaining the same strength in all parts. After the molding is completed the outside part of the mold can be removed in about two hours and the vault left to harden on the core. It can then be turned over by the same means as has been described above with relation to the cover and the core removed from the completed article.

Having thus described my invention, I claim as new and desire to secure by Letters Patent—

1. The combination with a portable and invertible base, of a mold removably mounted thereon, said base being provided with trunnions for suspending the mold located below the center of gravity when the mold is filled with plastic material, whereby the mold and base will be inverted by gravity when lifted on the trunnions.

2. A mold comprising a base, and trunnions mounted thereon for suspending the mold and base, said trunnions being located below the center of gravity when the mold is filled with plastic material, in combination with a cradle, a support for the mold, and means for securing the cradle and the support together with the mold between them.

3. A mold comprising a base, a sectional core mounted thereon, a removable side wall, and trunnions on the base for suspending the mold; said trunnions being located below the center of gravity when the mold is filled with plastic material.

4. A mold comprising a base, a sectional core mounted thereon, a removable side wall, and trunnions on the base for suspending the mold, said trunnions being located below the center of gravity when the mold is filled with plastic material; in combination with a cradle having a shape corresponding with a part of the article produced in the mold, a support, and means for securing the cradle and support together.

5. A mold comprising a base, and a hollow sectional core removably mounted thereon, said core having a transverse groove in its upper surface.

6. A mold comprising a base, a hollow core thereon having a closed upper surface composed of sections, a cross-piece within the core for holding the parts thereof in position, walls mounted upon the base and extending upwardly therefrom, extension-pieces upon said walls, uprights extending along said walls, and a rod for holding said uprights and walls together, said walls constituting an open-topped mold surrounding the core.

7. A method of molding a burial-vault, consisting in placing plastic material in an inverted open-bottom mold to form the upper portion of the vault, moving sweeps or formers along the upper surface of the inverted mold lengthwise and then moving sweeps or formers across the ends of the upper surface to complete the formation of the bottom of the vault.

In testimony whereof I have signed my name to this specification in the presence of two subscribing witnesses.

THEODORE FRANCIS GAEBLER.

Witnesses:
 EMMETT L. BATMAN,
 EMMET F. MARSHALL.